United States Patent
Nishimura et al.

(10) Patent No.: US 8,297,199 B2
(45) Date of Patent: Oct. 30, 2012

(54) RAILCAR PRIMARY SUSPENSION

(75) Inventors: Takehiro Nishimura, Kobe (JP); Yasufumi Okumura, Kobe (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 13/154,974

(22) Filed: Jun. 7, 2011

(65) Prior Publication Data

US 2011/0253004 A1   Oct. 20, 2011

(30) Foreign Application Priority Data

Feb. 13, 2009   (JP) ................................. 2009-031729

(51) Int. Cl.
  *B61F 5/26*   (2006.01)
(52) U.S. Cl. .................... 105/218.1; 105/218.2; 105/223
(58) Field of Classification Search ............... 105/218.1, 105/218.2, 223, 224.05, 224.06
  See application file for complete search history.

(56) References Cited

U.S. PATENT DOCUMENTS

| | | | | |
|---|---|---|---|---|
| 2,099,817 A * | 11/1937 | Mahana | ......................... | 105/102 |
| 2,740,622 A * | 4/1956 | Hickman | ......................... | 267/25 |
| 3,013,808 A * | 12/1961 | Willetts | ......................... | 280/684 |
| 3,101,938 A * | 8/1963 | Hirst | ........................... | 267/25 |
| 3,948,188 A * | 4/1976 | Zehnder | ......................... | 105/167 |
| 4,166,611 A * | 9/1979 | Geers et al. | ..................... | 267/3 |
| 4,356,775 A * | 11/1982 | Paton et al. | ................. | 105/218.2 |
| 4,619,544 A * | 10/1986 | Laidely | ......................... | 403/162 |
| 4,690,069 A * | 9/1987 | Willetts | ....................... | 105/224.1 |
| 5,189,962 A * | 3/1993 | Iwamura et al. | ........... | 105/218.2 |
| 2004/0123769 A1* | 7/2004 | Nishimura | .................. | 105/218.2 |
| 2011/0253004 A1* | 10/2011 | Nishimura et al. | ........... | 105/220 |

* cited by examiner

*Primary Examiner* — Jason C Smith
(74) *Attorney, Agent, or Firm* — Oliff & Berridge, PLC (57) ABSTRACT

A railcar primary suspension is configured to couple an axle box to a truck frame by a coupling mechanism. The coupling mechanism includes: a radius arm including a tubular part which has openings at both sides thereof; a shaft inserted into the tubular part and provided with projecting portions formed at both side surfaces of the shaft; a pair of receiving seats including fitting grooves in which the respective projecting portions are fitted; cover members configured to support the respective projecting portions; and fastening members configured to fix the cover members to the respective receiving seats. A portion of each fitting groove and a portion of the corresponding projecting portion, the portions contacting each other, respectively have arc surfaces, and a portion of each projecting portion and a portion of the corresponding cover member, the portions contacting each other, respectively have flat surfaces.

10 Claims, 6 Drawing Sheets

RAILCAR PRIMARY SUSPENSION

BACKGROUND OF THE INVENTION

1. Field of the Invention

The present invention relates to a railcar primary suspension configured to couple an axle box, which accommodates a bearing for supporting an axle, to a side frame of a truck frame by a connecting mechanism.

2. Description of the Related Art

In a railcar truck, an axle box accommodating a bearing for supporting an axle is supported by an primary suspension in a manner that allows the axle box to be displaced with respect to the truck frame. There are various types of primary suspensions. For example, in the case of an primary suspension of an radius arm type, an axle spring which is a coil spring is interposed between an axle box and a side frame of a truck frame disposed above the axle box, and a tip end portion of a radius arm extending in a vehicle longitudinal direction from the axle box is supported in a displaceable manner by receiving seats extending downward from the truck frame (e.g., see Japanese Patent No. 2799078).

Figure 10:
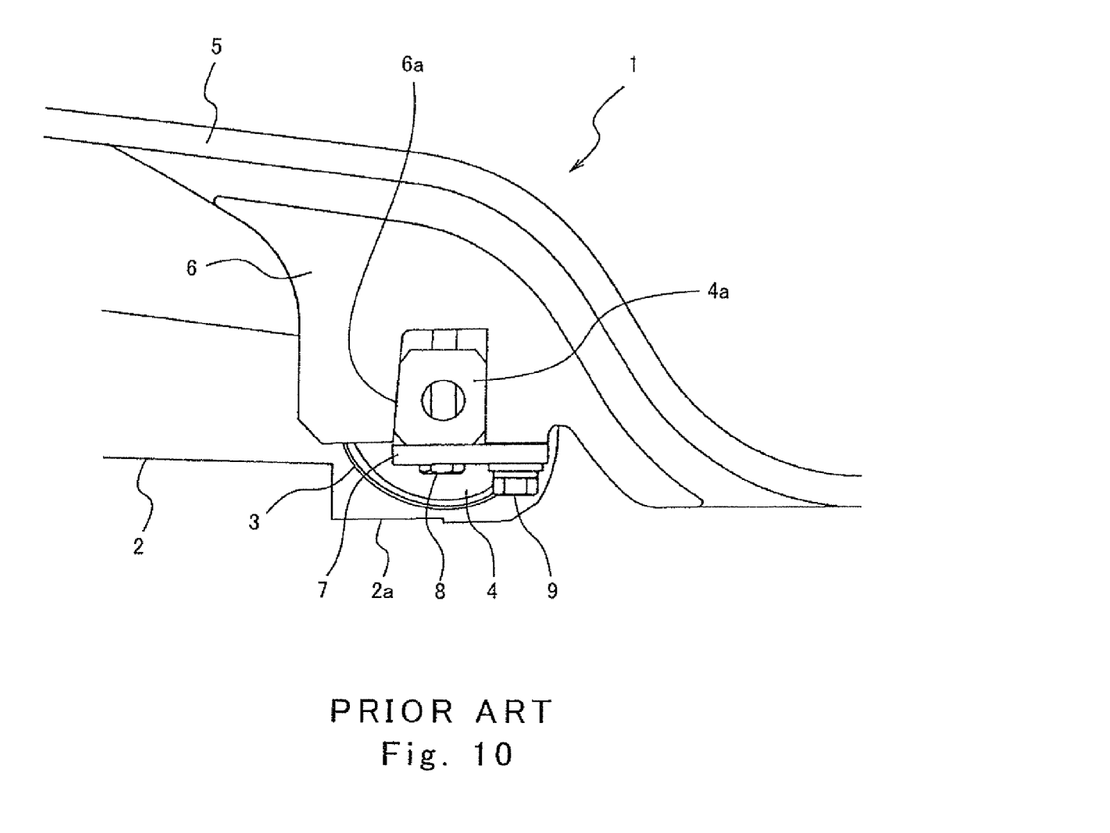
FIG. 10 is a side view showing a main part of a conventional primary suspension.

Specifically, as shown in FIG. 10, in the case of a conventional primary suspension 1 of the radius arm type, a shaft 4 is attached via a rubber bushing 3 to a tip end tubular part 2a of an radius arm 2 extending in the vehicle longitudinal direction from an axle box (not shown). Projecting portions 4a are formed at both side surfaces of the shaft 4 in a vehicle width direction, and the projecting portions 4a are fitted from below in fitting grooves 6a of respective receiving seats 6 extending downward from a side frame 5 of a truck frame. One side surface of each projecting portion 4a and one side surface of the corresponding fitting groove 6a, the side surfaces being in contact with each other, are vertical surfaces, and the other side surface of the projecting portion 4a and the other side surface of the fitting groove 6a, the other side surfaces being in contact with each other, are upward-tapered surfaces slightly inclined inward. A plate 7 is fixed by two bolts 8 and 9 to a lower surface of the receiving seat 6 so as to close a lower end opening of the fitting groove 6a.

Since the other side surface of the projecting portion 4a and the other side surface of the fitting groove 6a, the other side surfaces being in contact with each other, are tapered surfaces, the more the bolts 8 and 9 are fastened, the more the projecting portion 4a is moved upward by the plate 7 within the fitting groove 6a, and thereby the projecting portion 4a is pressed into the fitting groove 6a. Accordingly, the projecting portion 4a is pressed into the fitting groove 6a in a manner similar to inserting a wedge. In this case, considering the strength of the receiving seat 6, it is necessary to set fastening torque of the bolts 8 and 9 to be lower than standard fastening torque of the other bolts (for example, the fastening torque of M12 bolts is 100 Nm and the fastening torque of M16 bolts is 244 Nm; however, the fastening torque of the bolts 8 and 9 for fixing the plate 7 is set to 60 Nm). Therefore, at the time of fastening the bolts 8 and 9, it is necessary to fasten them with torque that is different from the standard torque for fastening the other bolts nearby. This causes low workability and requires proficiency for the work.

Moreover, a predetermined area or larger needs to be secured as a contact area between the projecting portion 4a of the shaft 4 and the fitting groove 6a of the receiving seat 6. This requires performing the following onerous work: first, with the projecting portion 4a of the shaft 4 being fitted in the fitting groove 6a of the receiving seat 6, temporarily fasten the bolts 8 and 9 with torque higher than preset torque to sufficiently secure the contact area between the projecting portion 4a and the fitting groove 6a; thereafter, loosen the bolts 8 and 9; and then fasten the bolts 8 and 9 again with the preset torque. Furthermore, in order to confirm the contact area between the projecting portion 4a and the fitting groove 6a, it is necessary to measure by a gage whether the length, in the vertical direction, of a gap between an upper end surface of the projecting portion 4a and an upper end surface of the fitting groove 6a satisfies a predefined requirement.

SUMMARY OF THE INVENTION

The present invention is a railcar primary suspension configured to couple an axle box, which accommodates a bearing for supporting an axle, to a truck frame by a coupling mechanism, the coupling mechanism including: a radius arm extending in a vehicle longitudinal direction from the axle box and including, at an end of the radius arm, a tubular part which has openings at both sides thereof in a vehicle width direction; a shaft inserted into an inner space of the tubular part and provided with projecting portions formed at both side surfaces of the shaft in the vehicle width direction; an elastic bushing interposed between the tubular part and the shaft; a pair of receiving seats provided at the truck frame and including fitting grooves in which the respective projecting portions are fitted; cover members configured to support the respective projecting portions which are fitted in the respective fitting grooves; and fastening members configured to fix the cover members to the respective receiving seats, wherein a portion of each fitting groove and a portion of the corresponding projecting portion, the portions contacting each other, respectively have arc surfaces, and a portion of each projecting portion and a portion of the corresponding cover member, the portions contacting each other, respectively have flat surfaces.

According to the above configuration, a portion of each fitting groove and a portion of the corresponding projecting portion, the portions contacting each other, respectively have the arc surfaces. Therefore, even if the fastening torque of the fastening members increases and thereby the contact pressure of the projecting portion against the fitting groove increases, the contact pressure is exerted in multiple directions in a radially distributed manner. This prevents a stress concentrated in a single direction from being exerted on the receiving seat. This allows the fastening members, which are used for fixing the cover members to the respective receiving seats, to be fastened with a standard torque, similar to other fastening members. This significantly improves assembling workability. Moreover, a portion of each projecting portion and a portion of the corresponding cover member, the portions contacting each other, respectively have the flat surfaces. Accordingly, rotational vibration of the shaft is sufficiently suppressed. This prevents wear between the projecting portion and the fitting groove, thereby reducing the necessity of maintenance work.

The above and further objects and features of the invention will more fully be apparent from the following detailed description with reference to accompanying drawings.

DESCRIPTION OF THE PREFERRED EMBODIMENTS

Hereinafter, embodiments of the present invention will be described with reference to the accompanying drawings.

Embodiment 1

Figure 1:
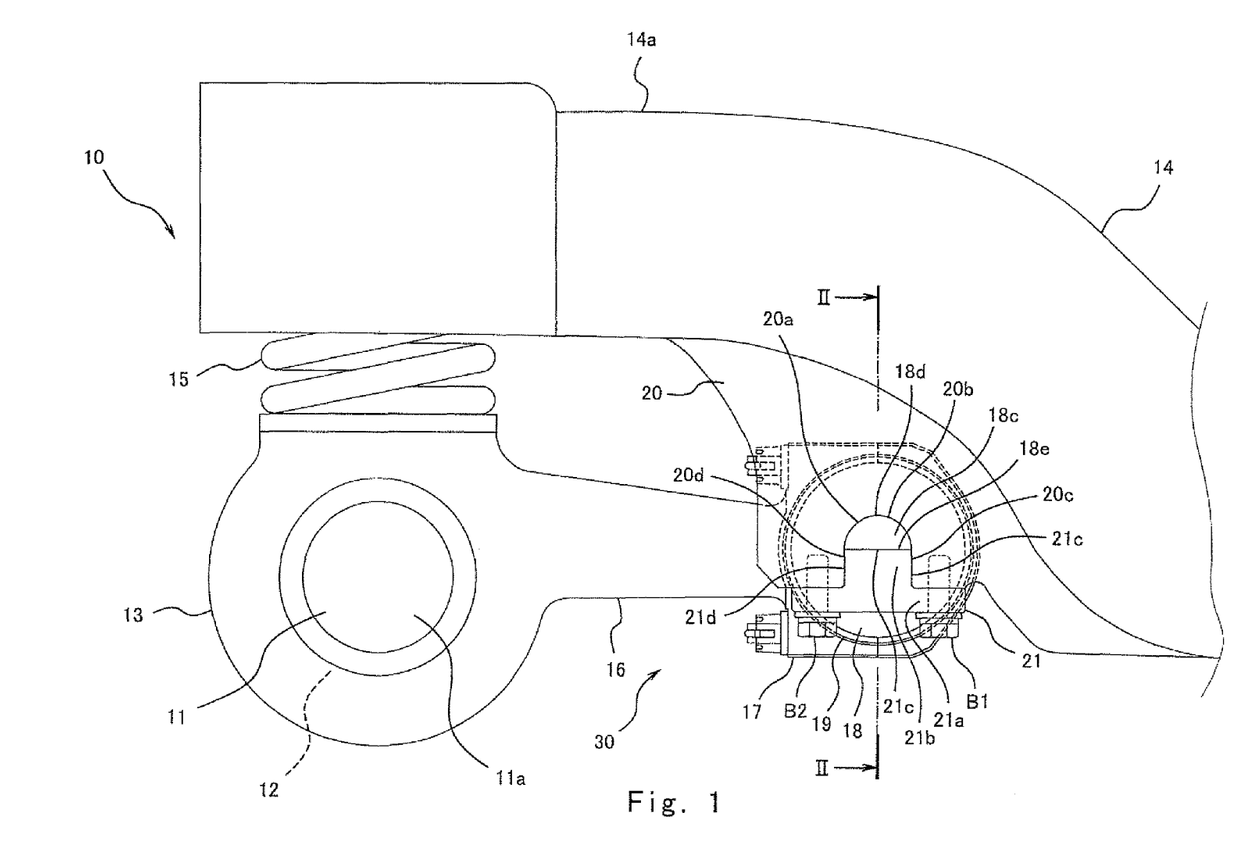
FIG. 1 is a side view of a primary suspension according to Embodiment 1 of the present invention.
Figure 2:
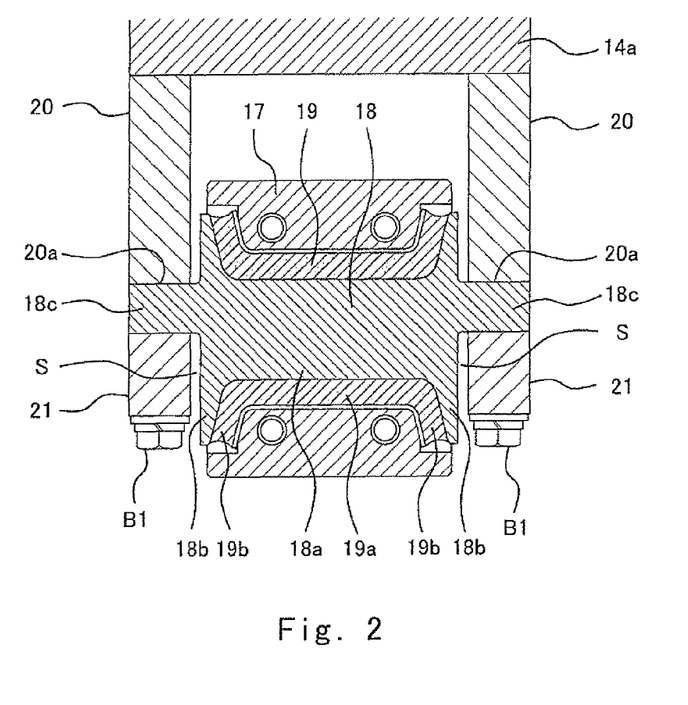
FIG. 2 is a cross-sectional view taken along line II-II of FIG. 1.
Figure 3:
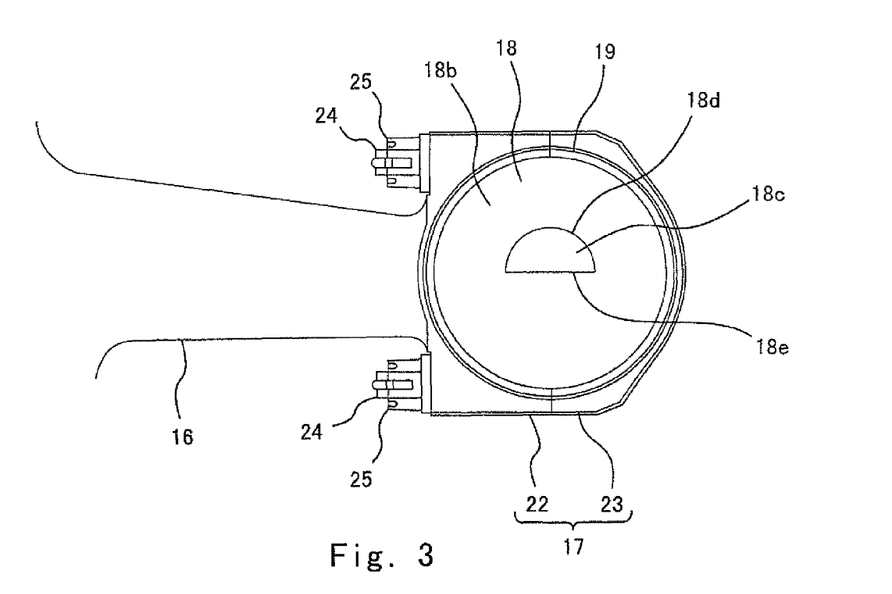
FIG. 3 is a main part enlarged view without a receiving seat and a cover member which are shown in FIG. 1.
Figure 4:
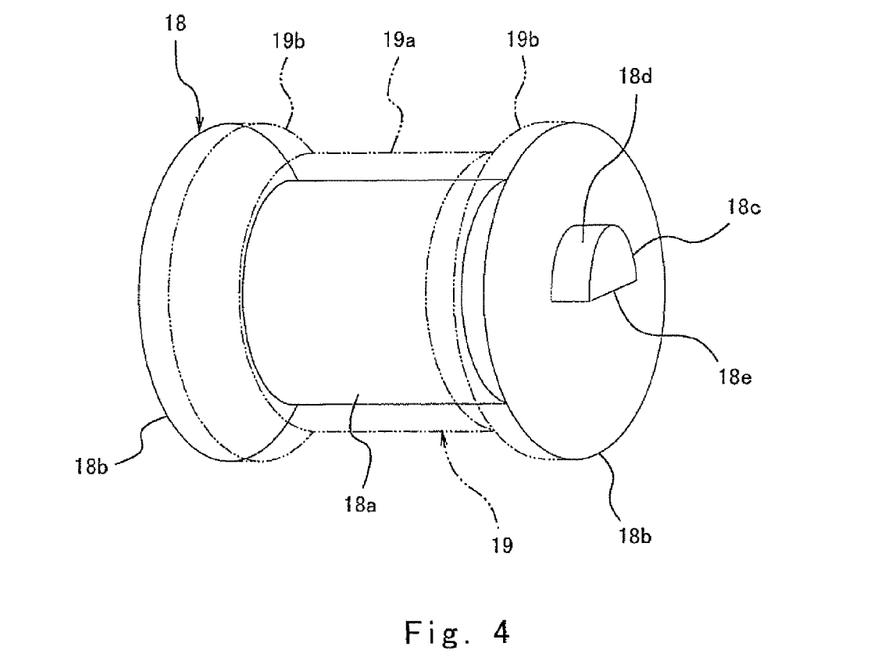
FIG. 4 is a perspective view of a shaft shown in FIG. 3.
Figure 5:
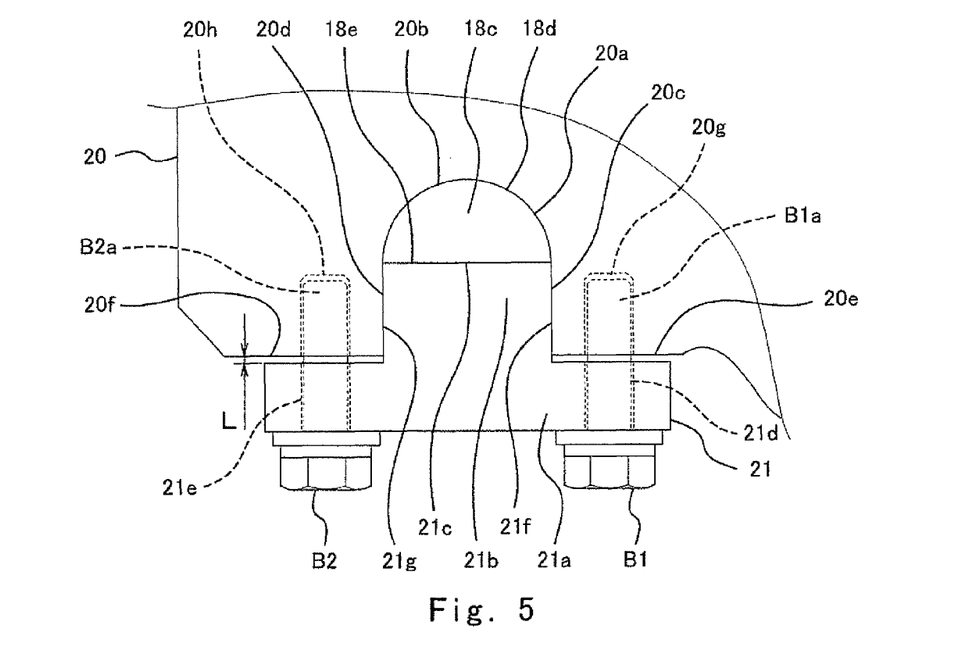
FIG. 5 is a main part enlarged view showing a state where bolts shown in FIG. 1 are being fastened.

FIG. 1 is a side view of a primary suspension 10 according to Embodiment 1 of the present invention. FIG. 2 is a cross-sectional view taken along line II-II of FIG. 1. FIG. 3 is a main part enlarged view without a receiving seat 20 and a cover member 21 which are shown in FIG. 1. FIG. 4 is a perspective view of a shaft 18 shown in FIG. 3. FIG. 5 is a main part enlarged view showing a state where bolts B1 and B2 shown in FIG. 1 are being fastened. As shown in FIG. 1, a railcar primary suspension 10 of the present embodiment is of the radius arm (axle beam) type. The primary suspension 10 includes an axle box 13 configured to accommodate a bearing 12 for rotatably supporting an axle 11a of a wheelset 11 including the axle 11a and wheels (not shown) provided at both ends of the axle 11a. An axle spring 15, which is a coil spring, is interposed between the axle box 13 and a side frame 14a (a side beam) of a truck frame 14 disposed above the axle box 13.

The axle box 13 is connected to the side frame 14a by a coupling mechanism 30. The coupling mechanism 30 includes a radius arm 16 formed integrally with the axle box 13 and extending from the axle box 13 in a vehicle longitudinal direction (i.e., a vehicle's travelling direction). A tubular part 17, the inner circumferential surface of which is in a cylindrical shape and which has openings at its both sides in a vehicle width direction, is provided at an end of the radius arm 16. The shaft 18 is inserted in an inner space of the tubular part 17 via a rubber bushing 19.

As shown in FIGS. 2 to 4, the shaft 18 includes: a cylindrical portion 18a; a pair of conical flange portions 18b respectively provided at both sides of the cylindrical portion 18a in the vehicle width direction; and projecting portions 18c outwardly protruding in the vehicle width direction from side surfaces of the pair of respective flange portions 18b. Each projecting portion 18c is a substantially semi-cylindrical portion. An upper surface of each projecting portion 18c is a substantially semi-circular arc surface 18d, and a lower surface of each projecting portion 18c is a flat surface 18e, the lower surface being continuous with the lower edges of the arc surface 18d. The rubber bushing 19 includes: a cylindrical portion 19a; and a pair of conical flange portions 19b respectively provided at both sides of the cylindrical portion 19a in the vehicle width direction. The rubber bushing 19 is externally fitted to the shaft 18.

The tubular part 17 provided at the end of the radius arm 16 has two segments that are a first semi-tubular portion 22 formed integrally with the radius arm 16 and a second semi-tubular portion 23 which is a separate portion from the first semi-tubular portion 22. Inner circumferential surfaces of the first semi-tubular portion 22 and the second semi-tubular portion 23 are formed along the outer circumferential surfaces of the cylindrical portion 19a and flange portions 19b of the rubber bushing 19. The first semi-tubular portion 22 and the second semi-tubular portion 23 sandwich the shaft 18 via the rubber bushing 19. The first semi-tubular portion 22 and the second semi-tubular portion 23 are fixed together by screw rods 24 and nuts 25. Since the tubular part 17 has such a two-segment structure, it is not necessary to press the rubber bushing 19, which is to be fitted around the shaft 18, into the tubular part 17 from the side. This allows the rubber bushing 19 including the flange portions 19b to be readily fitted around the shaft 18. Elasticity of the rubber bushing 19 allows the tubular part 17 to be displaced in the front-rear, left-right, and upper-lower directions with respect to the shaft 18. Although in the present embodiment the tubular part 17 is divided into two segments which are the first semi-tubular portion 22 and the second semi-tubular portion 23, the present invention is not limited thereto. The tubular part may be divided into more than two segments.

As shown in FIGS. 1 and 2, a pair of receiving seats 20 are provided at the side frame 14a in such a manner as to extend downward from both sides, in the vehicle width direction, of the lower surface of the side frame 14a. Each receiving seat 20 has an inverted U-shaped fitting groove 20a which is open downward. The projecting portions 18c of the shaft 18 are fitted into the respective fitting grooves 20a from below. With the projecting portions 18c fitted in the respective fitting grooves 20a, cover members 21 are fixed to the respective receiving seats 20 from below by the bolts B1 and B2 (i.e., fastening members) such that the downward opening of each fitting groove 20a is closed. The projecting portions 18c are supported by the respective cover members 21 from below. The lower edges of the respective flange portions 18b of the shaft 18 are positioned at a lower elevation than the lower surfaces of the respective cover members 21. Each of gaps S is formed between each of the side surfaces of the flange portions 18b of the shaft 18 and an inner surface of a corresponding one of the pair of receiving seats 20. These gaps S make it possible to readily fasten the bolts B1 and B2.

As shown in FIGS. 1 and 5, the length of the fitting groove 20a in the upper direction (i.e., a depth direction) is greater than the length of the projecting portion 18c in the upper direction. Each fitting groove 20a includes: a substantially semi-circular arc surface 20b which is recessed upward such that the shape of the arc surface 20b matches the shape of the arc surface 18d of the corresponding projecting portion 18c; and side surfaces 20c and 20d extending in the upper-lower direction, the side surfaces 20c and 20d being continuous with lower edges at both sides of the arc surface 20b, respectively. The side surfaces 20c and 20d are formed so as to be substantially parallel to each other. Each receiving seat 20 includes lower surfaces 20e and 20f (i.e., surfaces that are opposed to the corresponding cover member 21), which are formed at both sides of an opening at the lower end of the fitting groove 20a, respectively. Bolt holes 20g and 20h are formed in the lower surfaces 20e and 20f, respectively.

Each cover member 21 includes: a plate portion 21a opposed to the lower surfaces 20e and 20f of the corresponding receiving seat 20; and a protruding portion 21b protruding upward from the center of the plate portion 21a. The plate portion 21a has bolt holes 21d and 21e formed at its both sides, respectively, and the bolt holes 21d and 21e coincide with the bolt holes 20g and 20h of the corresponding receiving seat 20. The protruding portions 21b of the cover members 21 are fitted into the respective fitting grooves 20a through the openings at the lower end of the fitting grooves 20a, with the projecting portions 18c of the shaft 18 fitted in the respective fitting grooves 20a. Upper surfaces 21c of the respective protruding portions 21b support the lower surfaces 18e of the respective projecting portions 18c. The upper surfaces 21c of the protruding portions 21b, which contact the respective projecting portions 18c, are flat surfaces. Side surfaces 21f and 21g of each protruding portion 21b, which contact the corresponding fitting groove 20a, are formed so as to be substantially parallel to each other.

As shown in FIG. 5, each cover member 21 is configured such that when the cover member 21 is fixed to the corresponding receiving seat 20 by the bolts B1 and B2, the cover member 21 comes into contact with the lower surface 18e of the projecting portion 18c before coming into contact with the lower surfaces 20e and 20f of the receiving seat 20. Specifically, in a case where the protruding portion 21b of the cover member 21 is fitted into the fitting groove 20a from below, at a moment when the upper surface 21c of the protruding portion 21b comes into contact with the lower surface 18e of the projecting portion 18c, gaps each having a distance L are respectively formed between the plate portion 21a and the lower surface 20e of the receiving seat 20 and between the plate portion 21a and the lower surface 20f of the receiving seat 20 at both sides of the protruding portion 21b. Moreover, in this state, gaps each having at least the distance L are respectively formed between a tip end surface of a shank B1a of the bolt B1 and an end surface of the bolt hole 20g of the receiving seat 20 and between a tip end surface of a shank B2a of the bolt B2 and an end surface of the bolt hole 20h of the receiving seat 20.

When the bolts B1 and B2 are further fastened from this state, the protruding portion 21b is pressed against the projecting portion 18c in the upper direction. As a result, the projecting portion 18c is firmly held between the fitting groove 20a and the protruding portion 21b. To be specific, the pressing force by the cover member 21 at the time of fastening the bolts B1 and B2 is applied preferentially to the lower surface 18e of the projecting portion 18c over the lower surfaces 20e and 20f of the receiving seat 20. Moreover, the contact pressure between the lower surface 18e of the projecting portion 18c and the upper surface 21c of the protruding portion 21b is greater than the contact pressure between the side surface (21f, 21g) of the protruding portion 21b and the side surface (20c, 20d) of the fitting groove 20a. A load applied to the shaft 18 in the vehicle width direction is received by a friction force exerted by the projecting portion 18c that acts on the fitting groove 20a and the protruding portion 21b.

According to the above-described configuration, the upper surface of the projecting portion 18c and the upper surface of the fitting groove 20a, the surfaces contacting each other, are the semi-circular arc surface 18d and the semi-circular arc surface 20b, respectively. Therefore, even if the fastening torque of the bolts B1 and B2 is increased and thereby the contact pressure of the projecting portion 18c against the fitting groove 20a increases, the contact pressure is exerted in multiple directions in a radially distributed manner. This prevents a stress concentrated in a single direction from being exerted on the receiving seat 20. This allows the bolts B1 and B2, which are used to fix the cover member 21 to the receiving seat 20, to be fastened with a standard torque, similar to other bolts. This significantly improves assembling workability. Moreover, the lower surface 18e of the projecting portion 18c and the upper surface 21c of the protruding portion 21b of the cover member 21, the surfaces contacting each other, are flat surfaces. Accordingly, rotational vibration of the shaft 18 is sufficiently suppressed. This prevents wear between the projecting portion 18c and the fitting groove 20a, thereby reducing the necessity of maintenance work.

In the above embodiment, the projecting portion 18c of the shaft 18 has a substantially semi-cylindrical shape, and the protruding portion 21b of the cover member 21 is inserted into the fitting groove 20a. However, the projecting portion 18c and the cover member 21 may have any shapes so long as an arc surface is formed at each of the upper portion of the projecting portion 18c and the upper portion of the fitting groove 20a, the upper portions contacting each other, and a flat surface is formed at each of the lower portion of the projecting portion 18c and the upper portion of the cover member 21, the lower portion and the upper portion contacting each other. Moreover, in the above embodiment, two bolts B1 and B2 are used to fix one cover member 21. However, as an alternative, a part of the cover member may be engaged with the receiving seat and the cover member may be fixed using a single bolt. Furthermore, in the above embodiment, the first semi-tubular portion 22 and the second semi-tubular portion 23 are fixed together by the screw rods 24 and the nuts 25. However, as an alternative, the first semi-tubular portion 22 and the second semi-tubular portion 23 may be fixed together by bolts. The receiving seats may be provided at a cross frame (a cross beam) of the truck frame.

Embodiment 2

Figure 6:
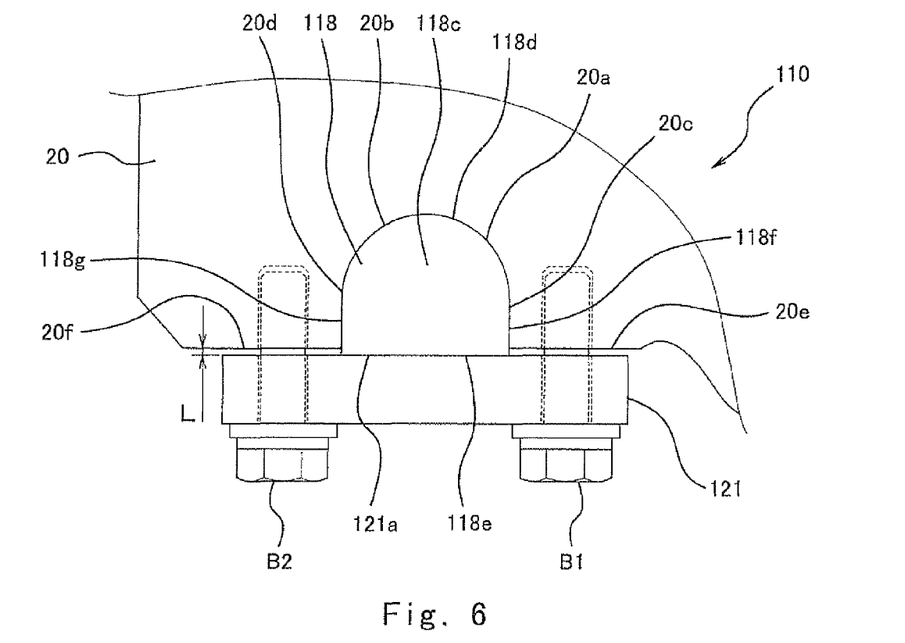
FIG. 6, corresponding to FIG. 5, shows the primary suspension according to Embodiment 2.

FIG. 6, corresponding to FIG. 5 of Embodiment 1, shows an primary suspension 110 according to Embodiment 2 of the present invention. As shown in FIG. 6, the primary suspension 110 of the present embodiment is different from Embodiment 1 in that projecting portions 118c of a shaft 118 and cover members 121 have different shapes from those of the projecting portions 18c of the shaft 18 and the cover members 21. It should be noted that in FIG. 6, the same components as those of Embodiment 1 are denoted by the same reference signs as those used in Embodiment 1. The external shapes of the projecting portions 118c of the shaft 118 substantially match the external shapes of the fitting grooves 20a. Specifically, each projecting portion 118c includes: an arc surface 118d which is a semi-circular upper surface; side surfaces 118f and 118g extending in the upper-lower direction, which are continuous with lower edges at both sides of the arc surface 118d, respectively; and a lower surface 118e which is continuous with the lower edges of the respective side surfaces 118f and 118g and is a horizontally flat surface. In a state where the projecting portion 118c is fitted in the fitting groove 20a and the arc surface 118d of the projecting portion 118c is in contact with the arc surface 20b of the fitting groove 20a, the lower surface 118e of the projecting portion 118e is positioned at a slightly lower elevation than the lower surfaces 20e and 20f of the receiving seat 20.

Each cover member 121 is a plate-shaped member. That is, the cover member 121 is not provided with the protruding portion 21b unlike Embodiment 1. In the case of fixing the cover member 121 to the receiving seat 20 by the bolts B1 and B2, the flat upper surface of the cover member 121 comes into contact with the lower surface 118e of the projecting portion 118c before coming into contact with the lower surfaces 20e and 20f of the receiving seat 20. Accordingly, gaps each having a distance L are respectively formed between the cover member 121 and the lower surface 20e of the receiving seat 20 and between the cover member 121 and the lower surface 20f of the receiving seat 20. When the bolts B1 and B2 are further fastened from this state, the cover member 121 is pressed against the projecting portion 118e in the upper direction. As a result, the projecting portion 118c is firmly held between the fitting groove 20a and the cover member 121. Description is omitted for the other components since they are the same as those previously described in Embodiment 1.

Embodiment 3

Figure 7:
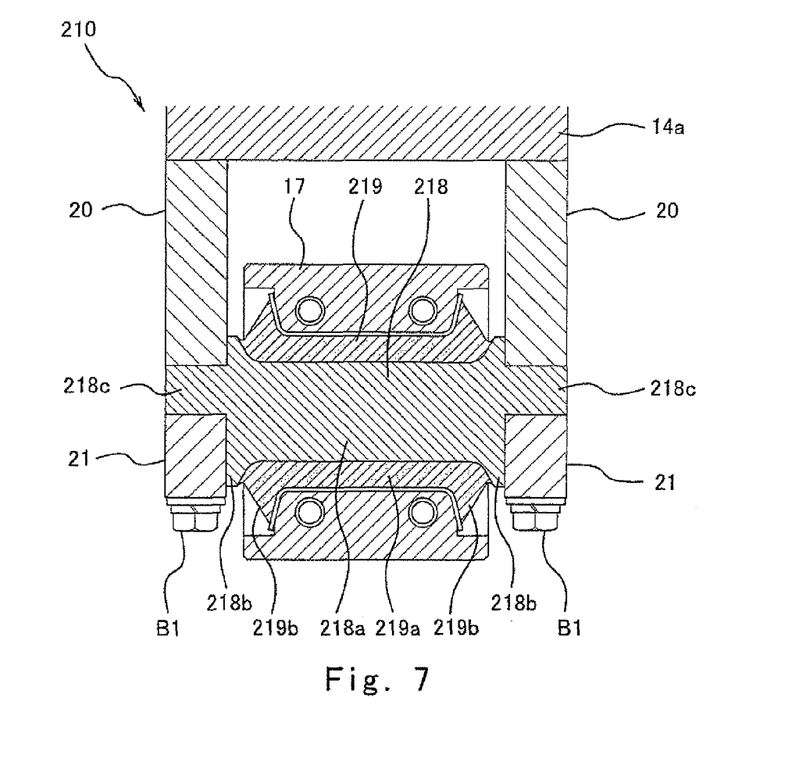
FIG. 7, corresponding to FIG. 2, shows the primary suspension according to Embodiment 3.

FIG. 7, corresponding to FIG. 2 of Embodiment 1, shows an primary suspension 210 according to Embodiment 3 of the present invention. As shown in FIG. 7, the primary suspension 210 of the present embodiment is different from Embodiment 1 in that both side surfaces of a shaft 218 are in contact with the inner surfaces of the respective receiving seats 20. It should be noted that in FIG. 7, the same components as those of Embodiment 1 are denoted by the same reference signs as those used in Embodiment 1. To be specific, the shaft 218 includes: a cylindrical portion 218a; a pair of conical flange portions 218b respectively provided at both sides of the cylindrical portion 218a in the vehicle width direction; and projecting portions 218c outwardly protruding in the vehicle width direction from side surfaces of the pair of respective flange portions 218b. The side surfaces, in the vehicle width direction, of the respective flange portions 218b are in contact with the inner surfaces of the respective receiving seats 20. The flange portions 218b are formed not to protrude downward beyond the lower surfaces of the cover members 21. That is, the length, in the radial direction, of the flange portion 218b of the shaft 218 is shorter than the length, in the radial direction, of the flange portion 18b of the shaft 18 of Embodiment 1. This makes it possible to readily fasten the bolts B1 and B2.

A rubber bushing 219 includes: a cylindrical portion 219a; and a pair of conical flange portions 219b respectively provided at both sides of the cylindrical portion 219a in the vehicle width direction. The length, in the radial direction, of the inner circumferential surface of each flange portion 219b of the rubber bushing 219 is set not to extend beyond the flange portions 218b of the shaft 218 in the radial direction. That is, the length, in the radial direction, of the inner circumferential surface of each flange portion 219b of the rubber bushing 219 is shorter than the length, in the radial direction, of the inner circumferential surface of each flange portion 19b of the rubber bushing 19 of Embodiment 1. Description is omitted for the other components since they are the same as those previously described in Embodiment 1.

Embodiment 4

Figure 8:
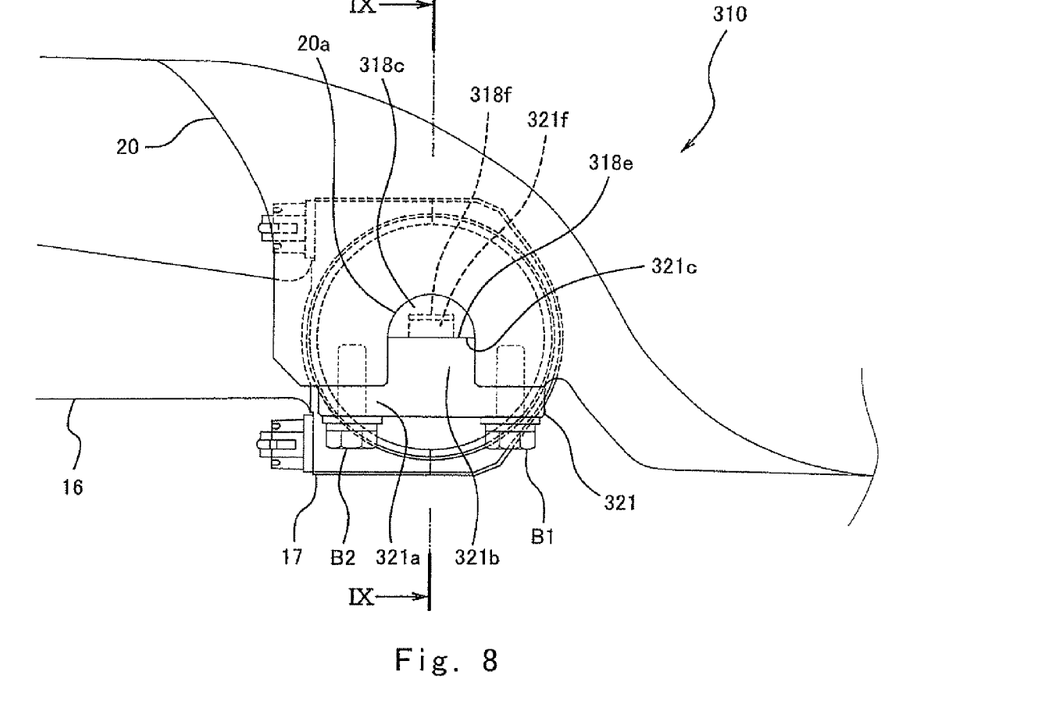
FIG. 8 is a side view showing a main part of the primary suspension according to Embodiment 4.
Figure 9:
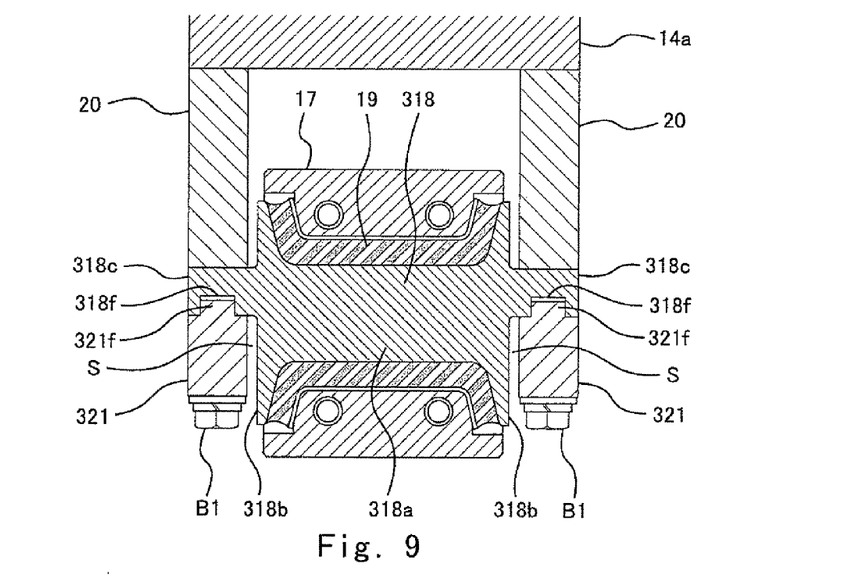
FIG. 9 is a cross-sectional view taken along line IX-IX of FIG. 8.

FIG. 8 is a side view showing a main part of a primary suspension 310 according to Embodiment 4 of the present invention. FIG. 9 is a cross-sectional view taken along line IX-IX of FIG. 8. As shown in FIGS. 8 and 9, the primary suspension 310 of the present embodiment is different from Embodiment 1 in that the primary suspension 310 includes recess-projection fitting structures where projecting portions 318c of a shaft 318 and protruding portions 321b of respective cover members 321 are fitted to each other. It should be noted that in FIGS. 8 and 9, the same components as those of Embodiment 1 are denoted by the same reference signs as those used in Embodiment 1. To be specific, the shaft 318 includes: a cylindrical portion 318a; a pair of conical flange portions 318b respectively provided at both sides of the cylindrical portion 318a in the vehicle width direction; semi-cylindrical projecting portions 318c outwardly protruding in the vehicle width direction from side surfaces of the pair of respective flange portions 318b; and recesses 318f, which are formed in lower surfaces 318e of the respective projecting portions 318c and are recessed in the upper direction. The lower edges of the respective flange portions 318b of the shaft 318 are positioned at a lower elevation than the lower surfaces of the respective cover members 321. Each of gaps S is formed between each of the side surfaces of the flange portions 318b of the shaft 318 and the inner surface of a corresponding one of the pair of receiving seats 20.

Each cover member 321 includes: a plate portion 321a opposed to the lower surfaces 20e and 20f of the corresponding receiving seat 20; a protruding portion 321b protruding upward from the center of the plate portion 321a; and a projection 321f protruding upward from an upper surface 321c of the protruding portion 321b. When each protruding portion 321b is inserted into the lower end opening of the corresponding fitting groove 20a with the projecting portions 318c of the shaft 318 fitted in the fitting grooves 20a of the cover members 321, each projection 321f is fitted into the corresponding recess 318f. Accordingly, the position of the shaft 318 with respect to the cover members 321 is determined, and a load applied to the shaft 318 in the vehicle width direction is stably received by the receiving seats 20 of the side frame 14a. Description is omitted for the other components since they are the same as those previously described in Embodiment 1.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A railcar primary suspension configured to couple an axle box, which accommodates a bearing for supporting an axle, to a truck frame by a coupling mechanism, the coupling mechanism comprising:
    a radius arm extending in a vehicle longitudinal direction from the axle box and including, at an end of the radius arm, a tubular part which has openings at both sides thereof in a vehicle width direction;
    a shaft inserted into an inner space of the tubular part and provided with projecting portions formed at both side surfaces of the shaft in the vehicle width direction;
    an elastic bushing interposed between the tubular part and the shaft;
    a pair of receiving seats provided at the truck frame and including fitting grooves in which the respective projecting portions are fitted;
    cover members configured to support the respective projecting portions which are fitted in the respective fitting grooves; and
    fastening members configured to fix the cover members to the respective receiving seats, wherein
    a portion of each fitting groove and a portion of the corresponding projecting portion, the portions contacting each other, respectively have arc surfaces, and a portion of each projecting portion and a portion of the corresponding cover member, the portions contacting each other, respectively have flat surfaces.

2. The railcar primary suspension according to claim 1, wherein
    each fitting groove is open downward,
    the arc surfaces are formed at an upper portion of each fitting groove and an upper portion of the corresponding projecting portion, and the flat surfaces are formed at a lower portion of each projecting portion and an upper portion of the corresponding cover member.

3. The railcar primary suspension according to claim 1, wherein each projecting portion has a substantially semi-cylindrical shape.

4. The railcar primary suspension according to claim 1, wherein the length of each fitting groove in a depth direction is greater than the length of each projecting portion in the depth direction, and each cover member includes a protruding portion configured to support the corresponding projecting portion fitted in the corresponding fitting groove, by being fitted into the fitting groove through an opening of the fitting groove.

5. The railcar primary suspension according to claim 1, wherein each receiving seat includes opposed surfaces that are formed at both sides of an opening of the fitting groove and are opposed to the corresponding cover member, and the cover members are formed such that when the cover members are fixed to the respective receiving seats by the fastening members, each cover member comes into contact with the corresponding projecting portion before coming into contact with the opposed surfaces of the corresponding receiving seat.

6. The railcar primary suspension according to claim 1, wherein the tubular part is divided into at least a first semitubular portion and a second semitubular portion, and the coupling mechanism further comprises a fixing member configured to fix the first semitubular portion and the second semitubular portion which sandwich the shaft via the elastic bushing.

7. The railcar primary suspension according to claim 6, wherein the elastic bushing includes flange portions at both sides thereof, respectively, in the vehicle width direction.

8. The railcar primary suspension according to claim 1, wherein each of gaps is formed between each of both of the side surfaces of the shaft in the vehicle width direction and each of inner surfaces, in the vehicle width direction, of the corresponding receiving seat and cover member.

9. The railcar primary suspension according to claim 8, wherein a recess is formed on one of the projecting portion and the cover member, and a projection for fitting in the recess is formed on the other of the projecting portion and the cover member.

10. The railcar primary suspension according to claim 1, wherein each of both of the side surfaces of the shaft in the vehicle width direction is in contact with an inner surface, in the vehicle width direction, of at least one of the receiving seat and the cover member.

* * * * *